Nov. 11, 1958 F. H. McINTOSH 2,860,192

AMPLIFIERS

Filed May 1, 1953

INVENTOR
FRANK H. McINTOSH

BY Hyman Hurwitz
ATTORNEY

1

2,860,192

AMPLIFIERS

Frank H. McIntosh, Chevy Chase, Md.

Application May 1, 1953, Serial No. 352,423
23 Claims. (Cl. 179—171)

This application is a continuation-in-part of my United States Patent No. 2,477,074, entitled "Wide Band Amplifier Coupling Circuits," issued July 26, 1949, and of my application for a United States patent, Serial No. 66,744, filed December 22, 1948, and entitled "Wide Band Transformers," now U. S. Patent Number 2,654,-058.

The present invention relates generally to improved audio and video frequency amplifiers, and more particularly to improved class B audio and video frequency amplifiers, which introduce extremely slight distortion in amplifying a wide band of frequencies, by utilizing output transformers of novel design, connected in novel relations of the electronic tubes of the amplifiers, the output circuit of the amplifier being of the single ended type.

The class B amplifier is a push-pull amplifier in which the tubes are biased approximately to cut-off. One of the tubes, in the normal system, amplifies the positive half cycles of the signal voltage, while the other amplifies the negative half cycles, the output transformer combining the outputs of the two tubes, to reconstruct a replica of the signal voltage.

The frequency limits of the conventional class B audio or video amplifier depend largely upon the design of the output transformer, loss in amplification at low frequencies resulting from the low incremental inductance of the transformer primary, and falling off at high frequencies resulting from leakage inductance and the various distributed capacities of the transformer.

In order to obtain a good low frequency response the incremental primary inductance of the transformer must be high relative to the plate resistances of the tubes used. The primary winding of the transformer, then, should have a large number of turns. At the same time the resonant frequency of the leakage inductance and secondary capacitance must be beyond the highest frequency desired to be amplified, so that low leakage inductance and shunt capacity is essential, if the high frequency response of the transformer is to be extended.

The above requirements are mutually conflicting, in various respects. The size of the core of a transformer, i. e. the total iron utilized, is limited by considerations of cost, space and weight requirements. This in turn fixes the total number of turns allotted to the primary and secondary windings. Decreasing core size and increasing total turns of the primary winding to retain high primary incremental inductance increases leakage inductance and shunt capacity, which in turn, reduces resonant frequency, and hence the high frequency response of the transformer. In fact, leakage inductance is decreased, in accordance with the prior art, by interleaving primary and secondary windings, but this expedient increases distributed capacity and so tends to neutralize the benefits obtained.

As a further consideration, high permeability cores must be used, to increase primary winding impedance.

2

Such cores are adversely affected, in respect to their incremental inductance, by D. C. magnetization. Hence the latter must be avoided.

The effect of leakage inductance on class B push-pull amplifiers has been considered in the literature, and attention is directed particularly to an article by A. Pen-Tung Sah in proceedings of the I. R. E. for November, 1936. Sah points out particularly frequently overlooked deleterious effects of leakage inductance between primary windings of the output transformer of such amplifiers, first in causing a decreased output, as frequency increases, and second, in introducing transients which distort the output wave as one of the tubes changes from a conducting position to a blocking condition, and vice-versa. The latter effect is the basis of great distortion at the higher audio frequencies.

I have provided, in the patent and patent applications hereinabove referred, to, disclosures of inventions which overcome the difficulties of the prior art, above briefly explained, and which provide class B push-pull amplifier circuits capable of wide-band operation with extremely slight distortion. At the same time the circuits are so arranged that they are primarily utilizable for balanced output circuits, and not especially adapted for single ended output circuits. In addition, the circuits illustrated in my U. S. patent hereinabove referred to, utilize arrangements which are half plate loaded and half cathode loaded, in Figures 2, 3, 4, and 6 in particular, and which accordingly, introduce considerable degeneration, which may be more or less than is desirable.

It is frequently desirable to have a push-pull audio amplifier capable of delivering output to a single ended circuit, i. e., to a circuit one end of which is grounded. This may be accomplished by the circuits of Figures 2, 3, 4, 6 of my patent above referred to by utilizing a separate secondary winding, one end of which is grounded, but in such case the capacity reflected into the balanced primary winding will not be uniform over the winding, so that the primary windings will become unbalanced.

If the push-pull circuits of my prior application and patent, above referred to, are arranged to operate with one cathode grounded, and without secondary winding, it then becomes possible to tap one of the windings to provide single ended output, in a very simple and economical fashion, since the necessity for a secondary winding is completely eliminated. It is, however, then necessary to develop ways of driving the tubes of the circuits in balanced relation.

It is, accordingly, a primary object of the present invention to provide an improved push-pull class B audio and video amplifier circuit, of the general character of that disclosed in the above identified U. S. patent and application, the amplifier, however, having a single ended output.

It is a further object of the invention to provide a novel push-pull wide band amplifier circuit, having negligible leakage reactance in its output transformer, and having a single ended output circuit.

It is still another object of the invention to provide a novel push-pull amplifier circuit which is fully anode loaded, or non-degenerative, the output transformer of which possesses negligible leakage reactance.

A further object of the invention resides in the provision of a novel push-pull amplifier which is half-cathode and half-anode loaded, or 50% degenerative, which possesses a single ended output, deriving from an output transformer having negligible leakage reactance, and no secondary winding.

Another object of the invention resides in the provision of a push-pull amplifier of the cathode follower type, having a single ended output deriving from an output transformer having negligible leakage reactance.

It is a further object of the invention to provide a novel mode of driving a push-pull amplifier having a single ended or unbalanced output.

Still another object of the invention resides in the provision of a push-pull electronic amplifier circuit operating class B, or class A, class AB, $AB_2$ etc. in which the anode of each of the push-pull tubes of the circuit is maintained always at the same A. C. potential as the cathode of the other of the tubes, which provides a single ended output circuit, the amplifier being fully anode loaded, fully cathode loaded, or partially anode loaded and partially cathode loaded, i. e. being totally non-degenerative, partially non-degenerative, or fully degenerative.

By providing different degrees of cathode and anode loading, i. e. by providing different amounts of degeneration in the circuits, a wide range of operating requirements may readily be met, and it is found that the advantages of the circuits of my patent and patent application above referred to are retained despite reduction of degeneration to zero.

It will further be realized that each of the circuits illustrated in this application may be operated with separate balanced or unbalanced secondary winding, if desired, in which case the circuits of the present invention provide further modifications of the circuits of the above referred to application and patent.

Briefly described, the present invention comprises a pair of push-pull amplifier tubes, #1 and #2, having a cathode winding in series between the cathodes of the tubes, and an anode winding connected between the anodes of the tubes, the two windings being bifilarly related, and adjacent ends of the bifilar windings being connected to the cathode of one of the tubes and the anode of the other of the tubes. By reason of the bifilar relation of the windings, which results in extremely close coupling, the cathode of each of the tubes is maintained always at the same A. C. potential as the anode of the other of the tubes.

The close coupling provided by the bifilarly related windings results in substantially zero leakage retctance, while the relation between the anodes and cathodes of the tubes, in respect to A. C. signals, eliminates the transient effects which occur in conventional amplifiers at times of cross-over of current conduction from one of the tubes to the other. These, and the other advantages, specifically pointed out in my prior application and patent, above referred to, are accordingly retained in the circuits of the present invention, and wide band response with substantially zero distortion becomes attainable.

In Figures 2, 3, 4 and 6 of my prior patent a source of anode voltage is connected between the center point of the cathode coils and the center point of the anode coils. In accordance with the present invention, a source of anode voltage connected with its positive terminal to the anode of one of the tubes, say tube # 1, and the negative terminal of the source, which may be grounded, is connected to the cathode of the other of the tubes. An output tap may then be taken from the cathode winding, at a point providing the desired output impedance, with respect to ground, and a single ended output results. It will be noted that an analogous arrangement is employed in Figures 1 and 5 of my patent above referred to.

The problem remains however of symmetrically driving the tubes from a push-pull driver stage, without unbalancing the circuit, consideration being given to the fact that one of the tubes has a grounded cathode, while the other tube does not, but rather has a cathode floating with respect to ground in accordance with input signal.

Three embodiments of the present invention are illustrated and described, one of which is fully anode loaded and utilizes a cathode follower driver, one is fully cathode loaded, and one half-anode and half-cathode loaded, the latter two employing plate loaded drivers. The difference between these embodiments resides primarily in the mode of driving the tubes, to accomplish no degeneration, full degeneration, or partial degeneration, as will become evident as the description proceeds. An additional modification employs a plate loaded or non-degenerative power stage, and cathode follower drivers.

Reference is now made to the accompanying drawings, wherein.

Figure 4:
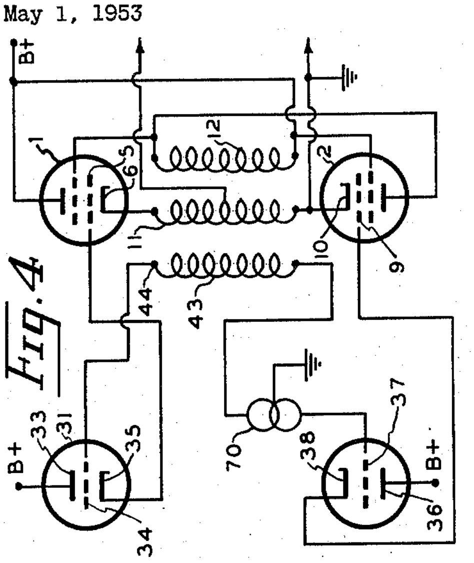
Figure 3:
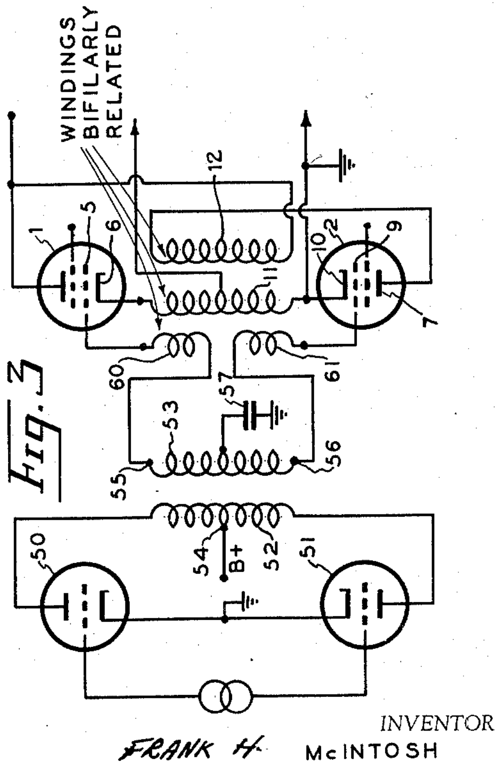

Figure 3 illustrates schematically a push-pull class B operated amplifier having single ended output, and which is driven so as to be half cathode and half plate loaded, or to be partially degenerative, the driving stage being plate loaded; and Figure 4 illustrates schematically a push-pull class B operated amplifier, having single ended output which is fully plate loaded, or non-degenerative, and in which a driver circuit is provided which operates cathode loaded, the cathodes of the driver stage being connected directly to the control electrodes of the power stage.

Figure 1:
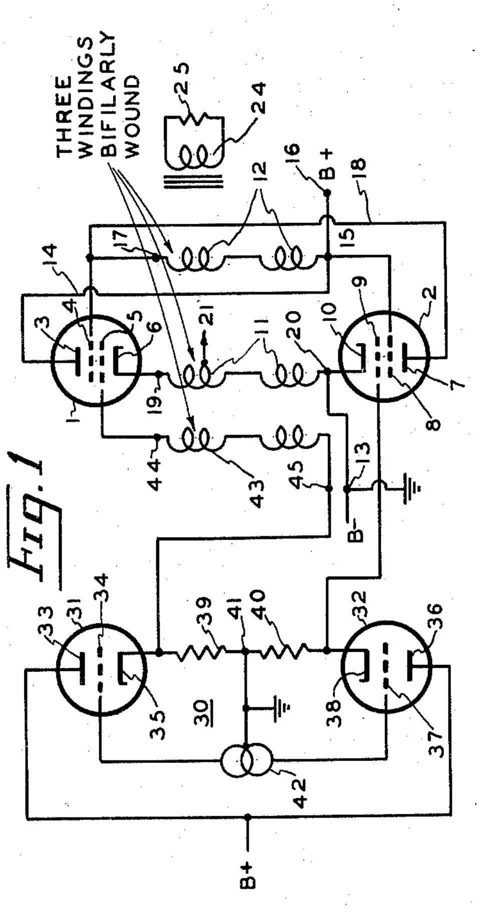
Figure 1 illustrates schematically a fully anode loaded or non-degenerative push-pull amplifier arrangement, driven by a push-pull cathode follower driver stage, in accordance with the invention.

Referring now more particularly to Figure 1 of the accompanying drawings, the reference numeral 1 identifies a tetrode vacuum tube, reference number 2, a second tetrode vacuum tube, the tubes connected in a push-pull class B amplifier arrangement. The amplifier tube 1 may be provided with an anode 3, a screen grid 4, a control grid 5, and a cathode 6, the latter being heated in a mode not illustrated. Similarly, the vacuum tube 2 may comprise an anode 7, a screen grid 8, a control grid 9, and a cathode 10, heated in some manner, conventional per se in the art.

Connected between the cathode 6 of the tube 1 and the cathode 10 of the tube 2, is a winding 11. Connected between the anode 3 of the tube 1 and the anode 7 of the tube 2 is a further winding 12. The windings 11 and 12 are bifilarly related, that is they are wound on a core, together and in parallel, as if the strand comprising the winding 11 and the strand comprising the winding 12 were a single strand of wire. The cathode 10 of the tube 2 is grounded, at 13. The anode 3 of the tube 1 is connected via a lead 14 directly to a terminal 15, to which is connected the B+ lead 16 of a suitable power supply. The terminal 17 of the winding 12 is connected directly via a lead 18 to the anode 7 of the tube 2. The terminal of the winding 11 which is directly connected to the cathode 6 of the tube 1 may be identified by the reference numeral 19 while the terminal of the winding 11 which is connected directly to the cathode 10 of the tube 2 may be identified by the reference numeral 20.

By reason of the befilar relation between the windings 11 and 12 the A. C. potential at the terminal 19 and the A. C. potential at the terminal 17 are at all times identical, in response to current flow at signal frequencies in either of the windings 11, 12. Similarly, the terminals 15 and 20 remain always at the same A. C. potential in response to current flow in either of the windings 11, 12.

It follows that the anode 3 is at the same A. C. potential as is the cathode 10, and that the cathode 6 of the tube 1 is at the same A. C. potential as the anode 7 of the tube 2, while the amplifier is being driven, in response to current flow in the tubes. Since the terminal 20 is grounded at 13, a tap, as 21, may be taken from the winding 11 at a point where the impedance is suitable for an intended use, and voltage may be derived between ground and the tap 21. Accordingly, the output of the device is single ended.

Clearly, if desired, a low impedance secondary winding may be coupled to the windings 12 and 13, in any desired fashion, and the secondary winding, which may be identified by the reference numeral 24, may be connected to a load conventionally illustrated as an impedance 25. However, the secondary winding is not essential to the circuit, but represents a possible modification thereof, and it is a particular feature of the preferred embodiment of the invention that the output may be taken from the tap 21 on the winding 11, the ouput then being single ended. It is desirable that the screen grid of each of the tubes 1 and 2 be maintained at a fixed potential with respect to the respective cathodes of the tubes 1 and 2, while the tubes are being driven. Since during driving of the tubes the cathode of tube 2 remains fixed with respect to ground while the cathode of the tube 6 floats, a suitable arrangement for maintaining the desired voltage relation between the screen grids and the cathodes is required, which may be realized as follows.

The screen grid 4 of the tube 1 may be connected to the terminal 17, which has always the same A. C. potential as the cathode terminal 19. The screen grid 8 of the tube 2 may be connected to the terminal 15, which has always the same A. C. potential as the cathode 10 of the tube 2. At the same time, the terminal 15 and the terminal 17 are connected to the B+ lead 16 so that the screen grids 4 and 8 are maintained at suitable D. C. potentials, these being superposed on the A. C. voltage variations of the cathodes of the tube.

In order to drive the tubes 1 and 2 there is provided a driver stage, generally indicated by the reference numeral 30 and comprising a triode 31 and a triode 32. The triode 31 has an anode 33, a control grid 34, and a cathode 35. The triode 32 similarly has an anode 36, a control grid 37, and a cathode 38. The triodes 31 and 32 are operated as cathode followers, being provided respectively with load resistances 39 and 40 between the cathodes 35 and 38 and a balanced ground point 41. The control electrodes 34 and 37 are then driven push-pull by means of a push-pull signal source 42. There are accordingly developed across the cathode resistors 39, 40 equal push-pull voltages, cathodes 35 and 38 being always in opposite polarity except when they are at zero potential. The cathode 38 is connected directly with the control grid 9 of the tube 2 while the cathode 35 of the tube 31 is connected to the control grid 5 of the tube 1 through a series winding 43, which is bifilarly wound with respect to the windings 11 and 12. It will be realized that the wire size of the coil 43 may be quite small since this coil need not carry any appreciable current, but only enough to satisfy the grid requirements of the tubes 1 and 2. The bifilar relation between the coil 43 and the coil 11, in particular, means that the terminal 44 of the coil 43 is maintained at the same potential as the terminal 19 of the coil 11 in response to current flow in the winding 11. Similarly the terminal 45 of the winding 43 is maintained at the same potential as the terminals 20, due to such current flow. Superposed on this zero difference of potential between the points 19, 44, due to current flow in the tube 1, is the voltage generated across the resistance 39, which is in series with the grid-cathode circuit of the tube 1. It follows that the difference of potential between the control grid 5 and the cathode 6 will be only the voltage appearing across the resistance 39. Similarly, the voltage appearing between the control grid 9 and the cathode 10 will be that appearing across the resistance 40, since grid 9 is connected to one terminal of the resistance 40 and since the other terminal of the resistance 40 is grounded and hence connected to the cathode 10 directly.

It will be noted that the tubes 1 and 2 are operated plate loaded, that is with no degeneration, since the signal voltage developed across the windings 11, 12, or any portion thereof, is not fed back to either of the control grids 5, 9.

We may say then that the purpose of the winding 43 is to compensate for the variations of potential of the cathode 6 with respect to ground, caused by flow of signal current, i. e. to introduce identical variations of the voltage applied to the control grid 5, superposed on the signal voltages supplied from the resistance 39, as appears across the load due to tube current flow.

Figure 2:
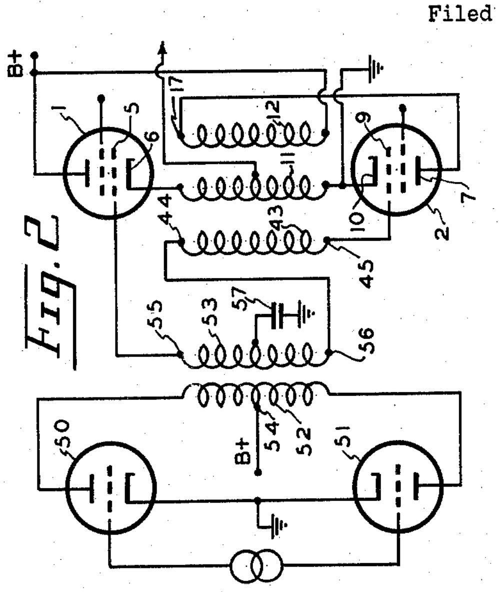
Figure 2 illustrates schematically a push-pull class B amplifier having a single ended output, and which is operated as a cathode follower or fully degenerative circuit, driven from a plate loaded driver stage.

Referring to Figure 2 of the accompanying drawings, the circuit illustrated is that of a push-pull class B amplifier having single ended output, as in the circuit of Figure 1, but in which complete degeneration occurs, so that the amplifier may be termed a cathode follower amplifier. Interconnection of the cathodes and anodes of tubes 1 and 2, in the embodiment of my invention illustrated in Figure 2 of the accompanying drawings, as well as the mode of deriving signal therefrom and of applying B+ voltage thereto, is identical with that illustrated in Figure 1, and above fully explained. Accordingly, further description thereof is dispensed with in the interest of conciseness.

The driver stage in Figure 2 consists of the plate loaded push-pull amplifier comprising triodes 50, 51, having a center tapped primary winding 52, interconnecting the anodes of the tubes, and having a source of B+ voltage 53, connected to the center tap 54 of the winding 52. The tubes 50, 51 may be driven in push-pull relation, and may constitute, for example, a class A voltage amplifier stage, if desired. Associated with the primary winding 52 is a secondary winding 53, one terminal 55 of which is connected directly with the control grid 5 of the tube 1, while the other terminal 56 is connected through the grid winding 43 to the control grid 9 of the tube 2. The center point of the secondary winding 53 is connected to ground via a low impedance coupling condenser 57, and may be assumed accordingly to remain at ground potential for A. C. signals. It follows that the input potential applied between the control grid 5 and the cathode 6 of the tube 1 is equal to the total voltage appearing across the winding 53. If we assume that the terminal 55 is driven positive, so that the tube 1 conducts and the tube 2 remains non-conducting, current flows in the winding 11 and the potential of the cathode 6 rises with respect to ground. This rise in potential is transferred to the winding 43, the potential of the point 44 of the winding 43 remaining the same as the potential of the cathode 6, for A. C. signals. Between the point 44 and the control grid 5 is connected the winding 53, to which is applied the positive signal. Accordingly, the difference in potential between the cathode 6 and the control grid 5 is that of the winding 53. However, the lower terminal 20 of the winding 11 is effectively connected with the center point of the winding 53, so that a series circuit exists from the cathode 6 to the terminal 20 through the condenser 57 and to the grid 5, in which the voltage component supplied by the winding 11 is present. Accordingly, the full voltage appearing across the winding 11 is applied back in degenerative phase, to control electrode 5, and for that reason the arrangement is spoken of as a cathode loaded or degenerative system. In similar manner when the tube 1 is cutoff and positive signal applied to the terminal 56, so that the tube 2 conducts, the terminal 17 of the winding 12 is reduced in voltage due to current flow through the winding 12 in series with the anode 7 of the tube 2, so that there is applied back to the control grid 9 the full voltage appearing across the winding 12. Otherwise stated, the point 44 of the grid winding 42 is always subject to the same potential as the point 17 of the winding 12 in series with the anode of the tube 2, and superposed on this feed-back voltage is the signal voltage deriving from the winding 53.

In consequence, current flow in either tube 1 or tube 2, whichever may be conducting, is reduced in response to the total voltage appearing across either winding 11 or winding 12, whichever may be carrying current.

In the system of Figure 3 are employed two driver tubes 50, 51, having connected between their anodes a primary winding winding 52, center tapped at 54, and connected at the center tap with a source of B+ potential. Secondary winding 53 is magnetically coupled with primary winding 52, and is provided with a center tap connected to ground via a capacity 57. One terminal 55 of the winding 53 is connected in series with a winding 60 to the control electrode 5 of the tube 1, and the other terminal 56 of the winding 53 is connected in series with a winding 61 to the control grid 9 of the tube 2. The tubes 1 and 2 are provided with windings 11 and 12, and supplied with anode voltage precisely as are the systems of Figures 1 and 2, the cathode 10 of the tube 2 being grounded. Accordingly, the power stage comprising the tubes 1 and 2 operates as in the systems illustrated in Figure 2 of the accompanying drawings, the sole difference between Figure 3 and Figure 2 residing in the mode of driving the tubes 1 and 2.

In the system of Figure 3, the windings 60 and 61 are each wound bifilarly with relation to the windings 11 and 12. However, half the number of turns is utilized in each of windings 60 and 61, so that the total voltage fed back to the control electrodes 5 and 9 of the tubes 1 and 2, respectively, via the windings 60 and 61, is similarly halved. The winding 60 has induced therein a feed-back voltage while the tube 1 is conducting current and the winding 11 accordingly is active. Similarly, the winding 61 feeds back voltage to the control electrode 9 of the tube 2 while the tube 2 is passing current, and accordingly while current flow exists in the winding 12. Since the total feed-back voltage is half of that which exists in the system of Figure 2, the system is denominated a half-cathode, half-plate loaded system. The output circuit of the system of Figure 3 is, however, identical with that of Figures 1 and 2, i. e. is single ended and derived from the cathode winding 11.

In the system of Figure 4 the power tubes 1 and 2 are supplied with voltage, and connected with the windings 11 and 12, precisely as in the system of Figures 1–3, inclusive, and a single ended output circuit is associated with windings 11 and 12 in the same way. The system of Figure 4 is driven by means of a cathode loaded or fully degenerative driver stage, but the power stage is fully plate loaded, or non-degenerative.

It will be noted that a push-pull source 70 is provided, having its center point grounded, and thereby connected to the cathode 10 of tube 2. The cathode 35 of tube 31 is connected directly to the control grid 5 of tube 1, and the cathode 38 of tube 32 is connected directly with the control grid 9 of tube 2. The control grids 34 and 37 of driver tubes 31 and 32 are driven from the push-pull source 70, in push-pull relation with respect to ground, the winding 43 being connected in series between the source 70 and the grid 34. The impedance of the winding 43 is so small relative to the input impedance of tube 31 as to be insignificant. The anodes 33 and 36 of driver tubes 31 and 32 are connected to a B+ source, which may be common to the two tubes.

The input circuit of tube 31 then proceeds from grid 34 to cathode 35, to grid 5 of tube 1, to cathode 6 of tube 1, through cathode load 11 to ground, and back to grid 34 via one side of source 70 and grid winding 43. The winding 43 serves to maintain correspondence of voltage between the cathode 6 of tube 1 and the control grid 34 of tube 31, except for the voltage provided by source 70. The input impedance of tube 1 is then the major portion of the cathode load of tube 31, and effectively the entire cathode load input. Tube 1 is operated without degeneration, but tube 31 is operated as a cathode follower.

Similarly, the tube 32 supplies input signal from source 70 to grid 37, cathode 38, grid 9, cathode 10, to ground. The input circuit for tube 32 therefore includes the input circuit of tube 2, as does also the load circuit of tube 32, and tube 32 is operated as a cathode follower.

While I have described and illustrated specific embodiments of the present invention, as required by the pertinent statutes, it will be clear that variations in detail and general arrangement may be resorted to without departing from the true spirit and scope of the invention as defined in the appended claims.

What I claim and desire to secure by Letters Patent of the United States is:

1. In a class B push-pull amplifier, a first vacuum tube having a first plate, control grid and cathode, a second vacuum tube having a second plate, control grid and cathode, a first winding connected between said first cathode and said second cathode, means connecting one of said cathodes directly to ground, a second winding connected between said first anode and said second anode, said windings bifilarly wound with respect to one another, and physically immediately adjacent terminals of said windings connected one to the cathode of one of said tubes and the other to the anode of the other of said tubes, a pair of output terminals for said amplifier extending from said second cathode and from a point of said first winding separated from said second cathode by a predetermined finite impedance, an input circuit for said class B push-pull amplifier comprising a push-pull amplifier driver stage having a push-pull output circuit, means maintaining said push-pull output circuit balanced with respect to the instantaneous potentials of said second cathode, and means for connecting said output circuit in balanced relation to the control electrodes of said class B push-pull amplifier.

2. The combination in accordance with claim 1 wherein said last means comprises a first connection from one side of said push-pull output circuit to one of said grids, and a further connection from the other side of said push-pull output circuit to the other of said grids, said further connection comprising a winding in series with said first connection and bifilarly related to each of said first and second windings.

3. The combination in accordance with claim 2 wherein said first connection from one side of said push-pull output circuit to one of said grids includes a winding in series with said one of said grids and bifilarly related to each of said first and second windings.

4. The combination in accordance with claim 2 wherein said winding in series with said first connection includes the same number of winding turns as each of said first and second windings.

5. The combination in accordance with claim 1 wherein said amplifier driver stage comprises first and second vacuum tube drivers having respectively at least a cathode, anode and control electrode, and wherein said output circuit of said amplifier driver stage consists of balanced impedances connected between the cathodes of said first and second vacuum tube drivers and having a center point connected to said first mentioned second cathode.

6. In a system of push-pull amplification, first and second amplifier tubes having each an anode, a cathode and a control electrode, means for grounding one of said cathodes, a winding connected in series between said cathodes, and balanced means for relatively driving said cathodes and control electrodes comprising a push-pull input circuit interconnecting said control electrodes and balanced with respect to ground, and means for compensating for variations of voltage with respect to ground of the other of said cathodes comprising a winding bifilarly wound with respect to the first mentioned winding and connected in series in the grid circuit of the amplifier tube containing the other of said cathodes.

7. In combination, a push-pull amplifier comprising a first power vacuum tube having at least a first anode, cathode and control grid, a second power vacuum tube having at least a second anode, cathode and control grid, a cathode winding connected between said cathodes, an anode winding having the same number of turns as said cathode winding and connected between said anodes, said cathode and anode windings bifilarly related to one another, said windings interconnecting said anodes and cathodes so as to maintain identical alternating potentials at said first anode and second cathode, and identical alternating potentials at said second anode and first cathode, means grounding said second cathode, means for connecting a source of B+ voltage directly to said first anode, a signal output lead connected to one of said windings at a point having a predetermined impedance with respect to ground, and means for driving said tubes in balanced push-pull relation.

8. The combination in accordance with claim 7 wherein said last means comprises a push-pull signal source balanced with respect to ground and connected in push-pull relation to said first and second control grids, and means for introducing in series with said first control grid a varying voltage having at all times a magnitude and phase adequate for balancing out at said first control grid potential variations of said first cathode with respect to ground.

9. In a class B push-pull amplifier, a first vacuum tube having a first anode, control grid and cathode, a second vacuum tube having a second anode, control grid and cathode, a first winding connected between said first cathode and said second cathode, a second winding connected between said first anode and said second anode, said windings bifilarly wound with respect to one another, and physically immediately adjacent terminals of said windings connected respectively to the cathode of one of said tubes and to the anode of the other of said tubes, a pair of output terminals for said amplifier extending from said second cathode and from a point of said first winding separated from said second cathode by a predetermined finite impedance, an input circuit for said class B push-pull amplifier comprising a push-pull amplifier driver stage having a push-pull output circuit, said push-pull output circuit balanced with respect to said second cathode, and means for connecting said output circuit in balanced relation to the control electrodes of said class B push-pull amplifier, said last means comprising a first connection from one side of said push-pull output circuit to one of said grids, and a further connection from the other side of said push-pull output circuit to the other of said grids, said further connection comprising a winding in series with said connection and bifilarly related to each of said first and second windings.

10. The combination in accordance with claim 9, wherein said first connection from one side of said push-pull output circuit to one of said grids includes a winding in series with said one of said grids and bifilarly related to each of said first and second windings.

11. The combination in accordance with claim 9, wherein said winding in series with said first connection includes the same number of winding turns as each of said first and second windings.

12. The combination in accordance with claim 9, wherein said amplifier driver stage comprises first and second vacuum tube drivers having respectively at least a cathode, anode and control electrode, and wherein said output circuit of said amplifier driver stage consists of balanced impedances connected between the cathodes of said first and second vacuum tube drivers and having a center point connected to said first mentioned second cathode.

13. In a push-pull amplifier, a first vacuum tube having a first anode, control electrode and cathode, a second vacuum tube having a second anode, control electrode and cathode, means connecting said second cathode directly to ground, a first output winding connected directly between said first and second cathodes, a second output winding connected directly between said first and second anodes, said windings substantially unity coupled and having two pairs of terminals, the terminals of either pair being at substantially the same A. C. potential due to the substantially unity coupling, means for connecting the terminals of one of said pairs to said first anode and second cathode respectively, means for connecting the terminals of the other of said pairs to said second anode and first cathode respectively, an input circuit for driving said first and second control electrodes of said amplifier, said input circuit including a driver network balanced with respect to ground, means responsive to said driver network for driving said first and second control electrode to cathode circuits equally and in balanced relation with respect to ground.

14. The combination in accordance with claim 13, wherein is included means for adding in series with said second control electrode to cathode circuit a voltage substantially equal and cophasal with the voltage across said first output winding.

15. The combination in accordance with claim 13, wherein is included means for introducing in series with at least one of said control electrode to cathode circuits a voltage counter-balancing at least a portion of the voltage developed across said first output winding.

16. An amplifier, comprising a first amplifier device having a first control electrode, a first output electrode and a first common electrode, a second amplifier device having a second control electrode, a second output electrode and a second common electrode, a first output transformer primary winding connected between said common electrodes, a second output transformer primary winding connected between said output electrodes, said first and second primary windings being closely coupled and relatively wound to maintain said first output electrode and said second common electrode at substantially the same A. C. potential, and to maintain said second output electrode and said first common electrode at substantially the same A. C. potential, a source of B+ voltage connected directly to only the first said output electrode, and circuits for driving said control electrodes in push-pull balanced relation relative to the instantaneous potentials of said common electrodes.

17. The combination according to claim 16, wherein is provided means for maintaining only the second of said common electrodes at fixed reference potential.

18. The combination according to claim 17, wherein said last-mentioned circuits comprise a source of push-pull drive voltage balanced with respect to said fixed reference potential, a first connection between one side of said source of push-pull drive voltage and said second control electrode, a further connection between the other side of said source of push-pull drive voltage and said first control electrode, said further connection including a further winding in series therewith, said further winding being substantially unity coupled to said output primary windings and arranged to reduce A. C. voltage variations between said first control electrode and said first common electrode.

19. The combination according to claim 18, wherein said further winding includes substantially the same number of turns as said first winding.

20. The combination according to claim 17, wherein said last-mentioned circuits comprise a source of push-pull drive voltage balanced with respect to said reference potential, a first connection between one side of said source of push-pull drive voltage and said first control electrode, a second connection between the other side of said source of push-pull drive voltage and said second control electrode, and a winding in at least one of said connections, said winding being closely coupled to said first winding and poled to reduce voltage variations between said first control electrode and said first common electrode.

21. The combination according to claim 20, wherein is included a winding in each of said connections, each of said windings being closely coupled to said first winding, and poled to reduce A. C. voltage variations between said first control electrode and said first common electrode, and between said second control electrode and said second common electrode.

22. In an amplifier, a push-pull stage of amplification, said push-pull stage of amplification including a first amplifying device and a second amplifying device, each having at least a signal output electrode, a signal input electrode, and a common electrode, a first transformer primary winding connected directly between said common electrodes, whereby said common electrodes are subject to relative A. C. voltage variations following said signal, a push-pull drive source for driving said input electrodes in push-pull relation, and means for reducing said A. C. voltage variations as seen between control electrode and common electrode of each of said amplifying devices to substantially zero, wherein is further provided a second transformer primary winding connected directly between said output electrodes and so coupled to and poled with respect to said first primary winding as to maintain substantial equality of A. C. voltage between the common electrode of said first amplifying device and the output electrode of said second amplifying device and between the common electrode of said second amplifying device and the output electrode of said first amplifying device, one only of said common electrodes being connected to a point at reference potential.

23. In an amplifier, a push-pull stage of amplification, said push-pull stage of amplification including a first amplifying device and a second amplifying device, each having at least a signal output electrode, a signal input electrode, and a common electrode, a first transformer primary winding connected directly between said common electrodes, whereby said common electrodes are subject to relative A. C. voltage variations following said signal, a push-pull drive source for driving said input electrodes in push-pull relation, and means for reducing said A. C. voltage variations as seen between control electrode and common electrode of each of said amplifying devices to substantially zero, wherein is further provided a second transformer primary winding connected directly between said output electrodes and so coupled to and poled with respect to said first primary winding as to maintain substantial equality of A. C. voltage between the common electrode of said first amplifying device and the output electrode of said second amplifying device and between the common electrode of said second amplifying device and the output electrode of said first amplifying device, and one only of said output electrodes being connected to a point at fixed D. C. voltage.

References Cited in the file of this patent

UNITED STATES PATENTS

| | | |
|---|---|---|
| 2,446,025 | Rockwell | July 27, 1948 |
| 2,452,563 | Golver | Nov. 2, 1948 |
| 2,477,074 | McIntosh | July 26, 1949 |
| 2,516,672 | Brockman | July 25, 1950 |
| 2,646,467 | McIntosh | July 21, 1953 |
| 2,648,727 | Rockwell | Aug. 11, 1953 |
| 2,770,686 | Hallden | Nov. 13, 1956 |

FOREIGN PATENTS

| | | |
|---|---|---|
| 892,851 | France | Jan. 17, 1944 |

OTHER REFERENCES

Sulzer: "A Survey . . . Circuits," Audio Engineering, May 1951, pp. 15, 46–48.